(12) United States Patent
Knott et al.

(10) Patent No.: US 8,309,664 B2
(45) Date of Patent: Nov. 13, 2012

(54) SILICONE-POLYETHER COPOLYMER SYSTEMS AND PROCESS FOR PREPARING THEM BY MEANS OF AN ALKOXYLATION REACTION

(75) Inventors: Wilfried Knott, Essen (DE); Frank Schubert, Neukirchen-Vluyn (DE); Frauke Henning, Essen (DE)

(73) Assignee: Evonik Goldschmidt GmbH, Essen (DE)

( * ) Notice: Subject to any disclaimer, the term of this patent is extended or adjusted under 35 U.S.C. 154(b) by 312 days.

(21) Appl. No.: 12/605,671

(22) Filed: Oct. 26, 2009

(65) Prior Publication Data

US 2010/0105843 A1    Apr. 29, 2010

(30) Foreign Application Priority Data

Oct. 29, 2008   (DE) .......................... 10 2008 043 245

(51) Int. Cl.
  C08F 283/06  (2006.01)
  C08F 283/12  (2006.01)
  C08G 77/08   (2006.01)
  C08G 77/38   (2006.01)
  C08G 77/46   (2006.01)
  C08L 83/12   (2006.01)

(52) U.S. Cl. ............................ 525/474; 528/19; 528/27

(58) Field of Classification Search .................. 525/474; 528/19, 27
See application file for complete search history.

(56) References Cited

U.S. PATENT DOCUMENTS

| | | | |
|---|---|---|---|
| 5,175,327 A * | 12/1992 | Parkinson et al. | 556/446 |
| 5,391,679 A | 2/1995 | Burkhart et al. | |
| 5,430,166 A | 7/1995 | Klein et al. | |
| 5,455,367 A | 10/1995 | Klein et al. | |
| 5,475,127 A | 12/1995 | Klein et al. | |
| 5,719,249 A | 2/1998 | Fujita et al. | |
| 5,880,245 A | 3/1999 | Fujita et al. | |
| 6,291,622 B1 | 9/2001 | Droese et al. | |
| 6,307,082 B1 | 10/2001 | Klein et al. | |
| 6,465,673 B1 * | 10/2002 | Imperante et al. | 556/437 |
| 6,750,193 B1 * | 6/2004 | Holderbaum et al. | 510/446 |
| 6,858,663 B2 | 2/2005 | Knott et al. | |
| 7,018,458 B2 | 3/2006 | Knott et al. | |
| 7,125,585 B2 | 10/2006 | Dudzik et al. | |
| 7,157,541 B2 | 1/2007 | Knott et al. | |
| 7,196,153 B2 | 3/2007 | Burkhart et al. | |
| 7,834,082 B2 * | 11/2010 | Haider et al. | 524/588 |
| 2004/0132951 A1 | 7/2004 | Burkhart et al. | |
| 2006/0155089 A1 | 7/2006 | Ferenz et al. | |
| 2006/0241270 A1 | 10/2006 | Burkhart et al. | |
| 2007/0043193 A1 | 2/2007 | Henning et al. | |
| 2007/0049717 A1 | 3/2007 | Knott et al. | |
| 2007/0128143 A1 | 6/2007 | Gruening et al. | |
| 2008/0125503 A1 | 5/2008 | Henning et al. | |
| 2008/0153934 A1 | 6/2008 | Neumann et al. | |
| 2008/0153992 A1 | 6/2008 | Knott et al. | |
| 2008/0153995 A1 * | 6/2008 | Knott et al. | 525/474 |

(Continued)

FOREIGN PATENT DOCUMENTS

CA   2 654 773   8/2009

(Continued)

*Primary Examiner* — Randy Gulakowski
*Assistant Examiner* — Mike M Dollinger
(74) *Attorney, Agent, or Firm* — Frommer Lawrence & Haug LLP

(57) ABSTRACT

Process for the preferential alkoxylation of silicone-polyether copolymers either alone or in compositions thereof containing, for example, excess polyether by use of double metal cyanide catalysts.

2 Claims, 3 Drawing Sheets

Formula (I)

U.S. PATENT DOCUMENTS

| | | | |
|---|---|---|---|
| 2009/0030097 A1* | 1/2009 | Knott et al. | 521/112 |
| 2009/0137751 A1 | 5/2009 | Knott et al. | |
| 2009/0137752 A1 | 5/2009 | Knott et al. | |
| 2010/0029587 A1 | 2/2010 | Bruckner et al. | |
| 2010/0041910 A1* | 2/2010 | Schubert et al. | 556/445 |
| 2010/0056649 A1 | 3/2010 | Henning et al. | |
| 2010/0071849 A1 | 3/2010 | Knott et al. | |
| 2010/0081781 A1 | 4/2010 | Schubert et al. | |
| 2010/0113633 A1 | 5/2010 | Henning et al. | |
| 2010/0184913 A1* | 7/2010 | Ebbrecht et al. | 524/588 |
| 2011/0245412 A1* | 10/2011 | Schubert et al. | 524/588 |

FOREIGN PATENT DOCUMENTS

| | | |
|---|---|---|
| CA | 2 670 305 | 12/2009 |
| EP | 0 573 864 | 12/1993 |
| EP | 2 093 244 | 8/2009 |
| EP | 2 107 077 | 10/2009 |
| EP | 2 138 526 | 12/2009 |
| WO | WO 2009/065641 | 5/2009 |
| WO | WO 2009/065644 | 5/2009 |
| WO | WO 2009/100793 | 8/2009 |

* cited by examiner

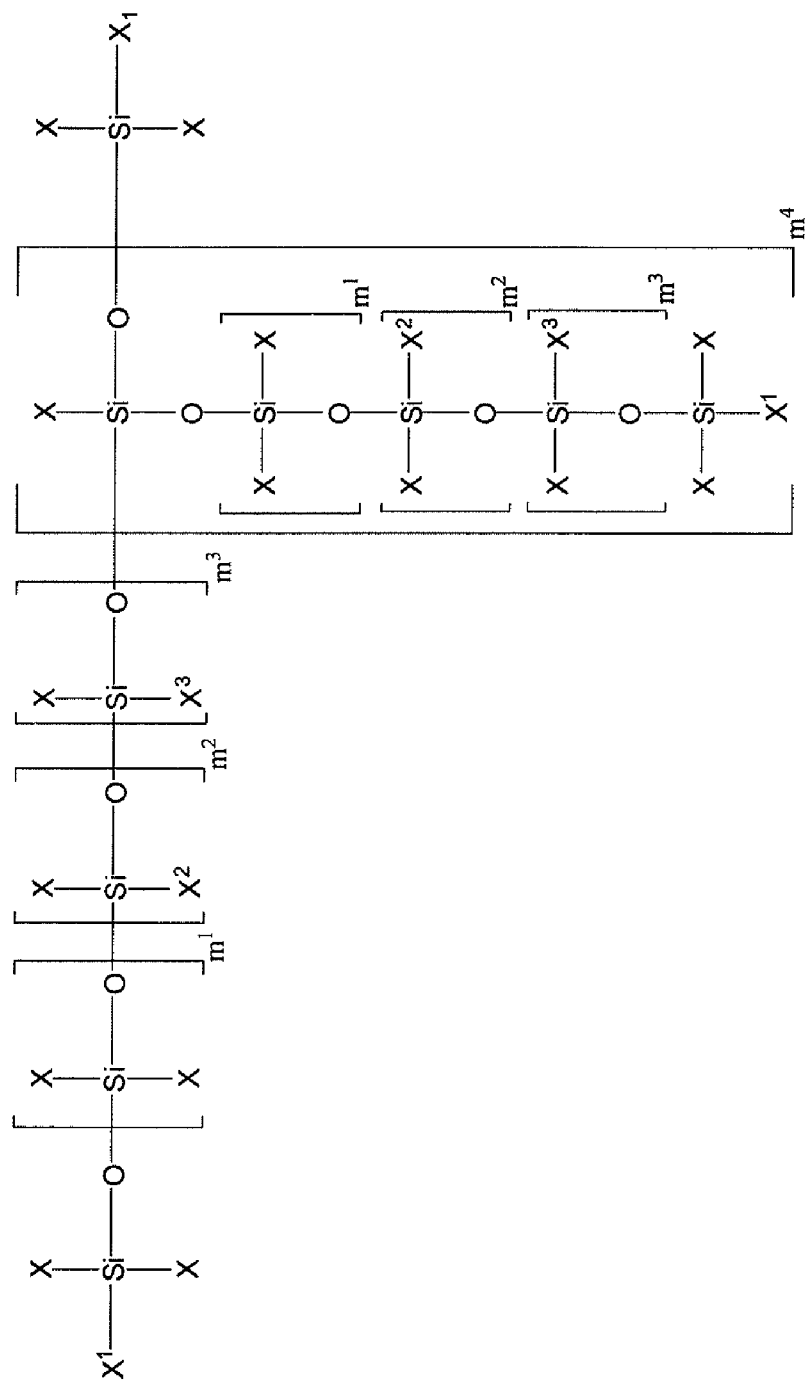
Fig. 1  Formula (I)

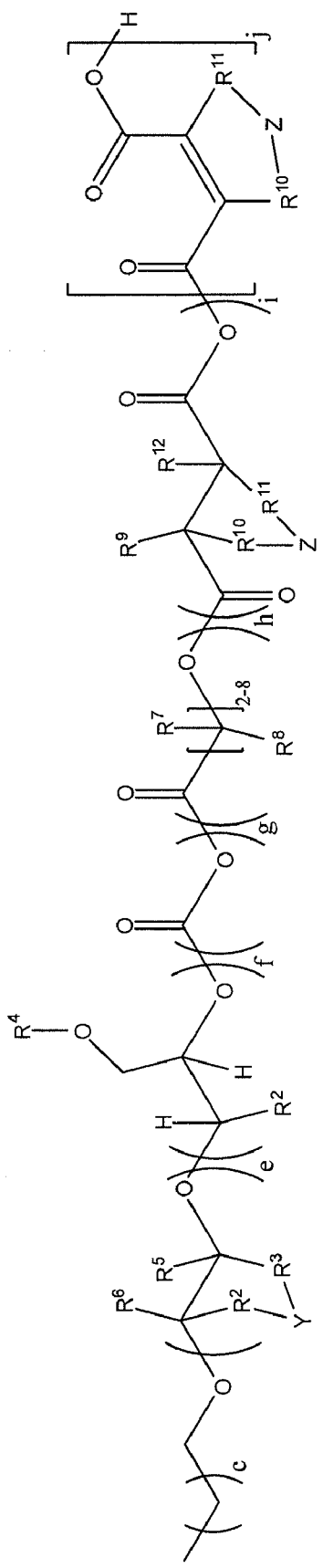
Fig. 2: Formula (Ia)

Figure 3: GPC analyses of the product from Example 5 in tetrahydrofuran against polypropylene glycol standard:
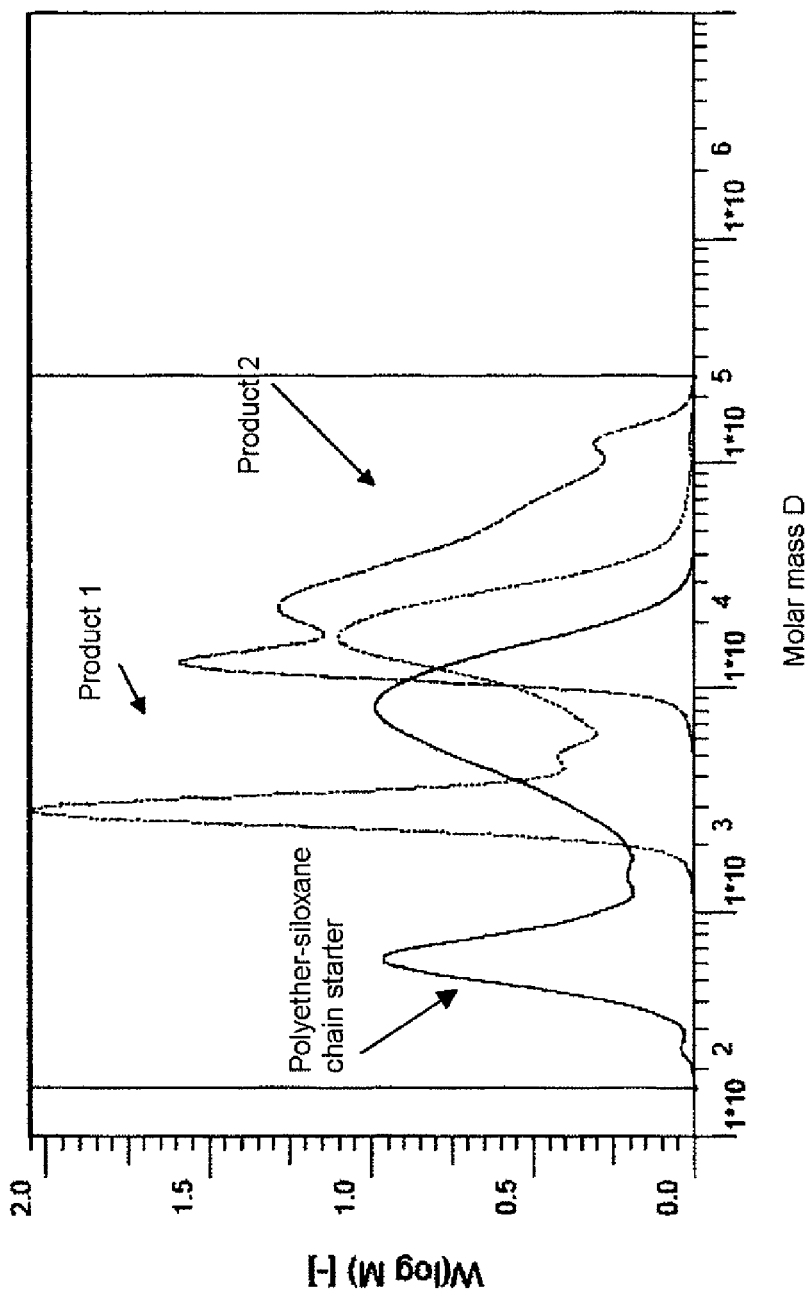

SILICONE-POLYETHER COPOLYMER SYSTEMS AND PROCESS FOR PREPARING THEM BY MEANS OF AN ALKOXYLATION REACTION

This application claims benefit under 35 U.S.C. 119(a) of German patent application DE 102008043245.8, filed on Oct. 29, 2008.

Any foregoing applications including German patent application DE 10 2008 043 245.8, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention relates to a process for the double metal cyanide-catalysed alkoxylation of silicone-polyether copolymers and their mixtures with polyetherols to give high molecular weight silicone-polyether copolymer systems having hydrophobic and hydrophilic structural elements.

Silicone-polyether copolymers are a class of substances which are employed in a wide variety of industrial applications, e.g. as surfactants, emulsifiers, wetting agents and dispersants, surface coating levelling agents, lubricants, as auxiliaries for tertiary petroleum recovery, as textile assistants for softening fibres, yarns or sheet-like textile products, as antifoams, as cosmetic additives (emulsifiers) and as foam stabilizers in particular in polyurethane foam.

The polyether-siloxanes can be used for such a variety of applications because their properties, in particular their hydrophile/hydrophobe balance, can be influenced and brought to the desired value by appropriate selection of the siloxane block or blocks and by an appropriate structure of the polyether block or blocks.

The siloxane block can be linear or branched and the absolute number of bifunctional and trifunctional siloxy units and their numerical ratio to one another can be set within wide limits. It is also possible to bind not only polyoxyalkylene radicals but also other modifying groups to the Si atoms. Examples are long-chain hydrocarbon radicals, hydrocarbon radicals substituted by halogen atoms, cyano groups or polar radicals, hydroxyl groups, etc.

Among silicone-polyether copolymers, a distinction is made in principle between SiOC- and SiC-bonded systems. In the first case, the siloxane framework is bound via SiOC bonds to the polyether radicals. In the second case, the siloxane part is linked to the polyether radicals via SiC bonds.

The earlier route for SiOC bonding involves, for example, the use of chlorosiloxanes which are reacted with polyether alcohols and often also using amine auxiliary bases as hydrochloric acid scavengers to form polyether-siloxanes. An alternative route to SiOC-based polyether-siloxanes is via dehydrogenative reaction of siloxanes bearing SiH groups (hydrogensiloxanes) with polyether alcohols in the presence of catalysts. Catalysts used are, for example, acids, bases and metal complexes and also tris(pentafluorophenyl)borane. Specific linear polyether-siloxanes can be obtained by direct alkoxylation of α,ω-dihydroxysiloxanes bearing SiOH groups by means of epoxide monomers, as described in the document U.S. Ser. No. 12/492,586 of 29 Jun. 2009, which is not a prior publication.

A route to SiC-bonded polyether-siloxane copolymers is provided by hydrosilylation, i.e. the usually noble metal-catalysed addition of siloxanes having SiH groups onto unsaturated polyethers, e.g. derivatives of vinyl or allyl alcohol. To synthesize the widespread allyl polyether-based copolymer systems, the unsaturated polyethers are used in a distinct stoichiometric excess of usually from 20 to 40 mol %, based on the SiH equivalents of the hydrogensiloxane used, in order to take account of the fact that, depending on the preparative route selected, varying amounts of propenyl polyethers are already present in the allyl polyether and to counter the allyl-propenyl rearrangement which is unavoidable in the hydrosilylation and makes part of the allyl polyether introduced unusable for the SiC linkage reaction. It may be pointed out that the terms polyether or polyetherol are sometimes used synonymously in the literature and the present application, but are clearly distinct from the silicone-polyether copolymers.

As a consequence of this procedure, the industrially available, SiC-bonded silicone-polyether copolymers derived from allyl polyethers contain not inconsiderable amounts of the isomerized excess polyether which, with its double bond in the position, is no longer hydrolysable but acts as a strong complexing agent towards metals, e.g. the platinum complexes frequently used in hydrosilylation.

Polyetherols, often also referred to simply as polyethers for short, have been known for a long time and are produced industrially in large quantities and serve, inter alia, by reaction with polyisocyanates as starting compounds for the preparation of polyurethanes or else for the preparation of surfactants.

Most processes for preparing alkoxylation products (polyethers) make use of basic catalysts such as alkali metal hydroxides and alkali metal methoxides. The use of KOH is particularly widespread and has been known for many years. A usually low molecular weight hydroxyl-functional starter such as butanol, allyl alcohol, propylene glycol or glycerol is typically reacted with an alkylene oxide such as ethylene oxide, propylene oxide, butylene oxide or a mixture of various alkylene oxides in the presence of the alkaline catalyst to give a polyoxyalkylene polyether. The strongly alkaline reaction conditions in this living polymerization promote various secondary reactions. Rearrangement of propylene oxide into allyl alcohol which functions as chain initiator and chain termination reactions result in formation of polyethers having a relatively broad molar mass distribution and unsaturated by-products. Particularly when allyl alcohol is used as starter alcohol, the alkoxylation reaction carried out with alkaline catalysis also produces propenyl polyethers. These propenyl polyethers behave as unreactive by-products in the hydrosilylating further processing to give SiC-bonded silicone-polyether copolymers and are also, due to the hydrolytic lability of the vinyl ether bond present therein and liberation of propionaldehyde, an undesirable source of odourous impurities in the product. This is described, for example, in EP-A-1 431 331 (US 2004-032951).

The disadvantages of base-catalysed alkoxylation without doubt also include the necessity of freeing the resulting reaction products of the active base by means of a neutralization step. The removal of the water formed in the neutralization by distillation and also the removal of the resulting salt by filtration are then absolutely necessary.

Apart from the base-catalysed reaction, acid catalyses of the alkoxylation are also known. Thus, DE 10 2004 007561 (U.S. Patent Appl. Pub. 2007-185353) discloses the use of $HBF_4$ and of Lewis acids such as $BF_3$, $AlCl_3$ and $SnCl_4$ in alkoxylation technology.

A disadvantage of the acid-catalysed polyether synthesis has been found to be the unsatisfactory regioselectivity in the ring opening of unsymmetrical oxiranes such as propylene oxide, which leads to polyoxyalkylene chains having some secondary and some primary OH termini in a not readily controllable manner. As in the case of the base-catalysed alkoxylation reaction, a work-up sequence of neutralization, distillation and filtration is also indispensable here. If ethylene oxide is introduced as monomer into the acid-catalysed polyether synthesis, the formation of dioxane as undesirable by-product has to be expected.

However, multimetal cyanide compounds or double metal cyanide catalysts, generally also referred to as DMC catalysts, are frequently also used as catalysts for the preparation of polyether alcohols. The use of DMC catalysts minimizes the content of unsaturated by-products, and the reaction also proceeds with a significantly higher space-time yield compared to the customary basic catalysts. The preparation and use of double metal cyanide complexes as alkoxylation catalysts has been known since the 1960s and is disclosed, for example, in U.S. Pat. Nos. 3,427,256, 3,427,334, 3,427,335, 3,278,457, 3,278,458, and 3,278,459. The ever more effective types of DMC catalysts developed in subsequent years and described, for example, in U.S. Pat. Nos. 5,470,813 and 5,482,908 include, in particular, zinc-cobalt hexacyanide complexes. Thanks to their extraordinarily high activity, only low catalyst concentrations are required for the preparation of polyetherols, so that the work-up steps necessary for conventional alkaline catalysts, namely neutralization, precipitation and removal of the catalyst by filtration, at the end of the alkoxylation process can be dispensed with. The alkoxylation products prepared using DMC catalysts have a much narrower molar mass distribution than products prepared by alkaline catalysis. The high selectivity of the DMC-catalysed alkoxylation is attributable to the fact that, for example, polyethers based on propylene oxide contain only very small proportions of unsaturated by-products.

In direct comparison with alkali and acid catalysis, the alkoxylation reaction carried out over DMC catalysts is, in terms of the technical peculiarities described, so advantageous that it has led to the development of continuous processes for preparing large volumes of simple polyetherols usually comprising only PO units.

EP 0 485 637 (U.S. Pat. No. 5,290,192) teaches a process for preparing organopolysiloxanes having polyoxyalkylene groups, which comprises subjecting organosiloxanes whose functional groups contain hydrogen atoms which are active towards alkylene oxides and fluorine compounds to a ring-opening polymerization by means of alkylene oxides over multimetal cyanide complexes. A disadvantage of an acid-catalysed preparation of the organopolysiloxanes has here been found to be that homopolymers of the alkylene oxides are formed as by-products, which would make it difficult to produce polyoxyalkylene compounds having high molar masses.

The pure organic fluorine compounds having defined molar masses which are described in EP 0 485 637 are just as easy to alkoxylate as the organosiloxane derivatives claimed in the teaching, whose functionality provides active hydrogen groups of the —OH, —SH, —NH$_2$, —NHR and —CO$_2$H type bound to a C$_3$-C$_{10}$-hydrocarbon radical which may contain an ether, thioether or amino bridge. The organosiloxane starting materials which can be obtained, for example, via hydrosilylation are easy to purify since the excess of the low molecular weight alcohols, thioalcohols, amines and acids used in their preparation can be separated off quite easily by distillation. The hydrophobicity of the organosiloxane chain starters used which is required in EP 0 485 637 means, firstly, that these have to be free of excess hydrophilic polyethers and, secondly, that their basic chemical structure is dominated by a hydrophobic, relatively long-chain siloxane backbone to which SiC-bonded short organic, preferably OH-functional radicals which have a maximum of 10 carbon atoms and can in no way be referred to as polyethers are bound. Such hydrophobic products are molecularly uniform and characterized in GPC analyses by a single peak, i.e. they are monomodal.

They are thus not classical surface-active polyether-siloxanes whose typical characteristic is that they are industrial, unpurified copolymers having long SiC-bonded terminal or lateral hydrophilic polyether chains and also contain further components such as hydrophilic unsaturated polyethers and their rearrangement products. It is a fundamental feature of polyether-siloxanes that they comprise a hydrophobic siloxane framework and a hydrophilic polyether part and have complex chemical compositions, i.e. are not defined pure substances. In surfactant applications, a balanced, preferably adjustable ratio of the hydrophobic (siloxane backbone) and hydrophilic (polyether substitution) radicals is thus not only desirable but necessary. In industrial polyether-siloxanes, it is not only the chemical structure of the polyether-siloxane copolymer which determines the property profile, but quite critically also the proportion of excess polyethers which is always present and usually makes up 20-40% by weight of the total product and gives the system increased hydrophilicity. Experience has shown that the surface-active properties of such hydrosilylation products are determined by the sum of all individual components, their chemical structure, their molar mass and molar mass distribution and the percentage in which they are present in the total system. In GPC analyses, the complexity of the products obtained by hydrosilylation shows up, in contrast to the hydrophobic organosiloxanes mentioned in EP 0 485 637, in the form of multimodal curves and very broad molar mass distributions. Thus, GPC analyses of typical industrial polyether-siloxanes are characterized by at least two maxima or at least two groups of peaks which differ significantly in terms of their molar mass. The presence of free polyethers shows up as one or more peaks in the low molecular weight range, often at molar masses below 5000 g/mol. These proportions of usually allyl alcohol-based excess polyethers represent relatively hydrophilic components in the total system. The GPC maxima in the relatively high molecular weight range up to 100 000 g/mol or even above are attributable to polysiloxane-polyether copolymers. They represent the main components in many reaction mixtures after hydrosilylation and are frequently obtained in a proportion of 60-80% by weight. Their structure comprises both a hydrophobic siloxane unit and one or more hydrophilic polyether chains which are chemically bound via SiC bonds in one molecule.

The use properties of these mixtures of substances having hydrophobic and hydrophilic structural elements are critically determined by their chemical composition and the chemical structure of all individual components. The composition of the polyether-siloxanes is in turn linked directly to the process principle of hydrosilylation. Virtually all reaction products in the noble metal-catalysed addition of, for example, allyl polyethers onto hydrogen siloxanes during the hydrosilylation, i.e. also rearrangement products or unreacted starting materials, are constituents of the end product. The chemistry of the hydrosilylation process thus places limits on the flexibility in the targeted development of polyether-siloxanes.

Thus, polyether-siloxanes having very long-chain polyethers can be prepared only with difficulty or not at all since the reaction rate in the hydrosilylation continues to decrease with increasing chain length of the polyether so that a quantitative SiH conversion is not possible or the amount of catalyst and the reaction time have to be increased so much that the preparation is uneconomical.

The polyether chains bound terminally or laterally to the respective siloxane framework are, in terms of their chain length, their molar mass distribution and monomer sequence, always identical to the excess polyethers. For given starting materials, only the mixing ratio of excess polyethers to silicone-polyethers can be influenced via the hydrosilylation conditions. In GPC analyses, this shows up in the fact that the position of the peaks along the molar mass axis is virtually impossible to alter when the hydrosilylation starting materials, viz. hydrogensiloxane and polyether, are predetermined.

On the basis of the present-day prior art, it is not possible to produce polyether-siloxane systems in which the free excess polyether is structurally different from the SiC-bonded polyether component of the copolymer.

It has now astonishingly been found that even industrial silicone-polyether copolymers having hydrophobic and hydrophilic structural elements which have complex compositions can be used as chain starters for alkoxylation reactions. This result is surprising to a person skilled in the art because these substances not only have a significantly lower density of active hydrogen atoms but are also of lower purity than the starters customarily used. Such highly functionalized polyether-siloxanes are sometimes also obtained by joint hydrosilylation of hydrogensiloxanes with mixtures of different high molecular weight polyethers, so that in such cases extremely broad molecular weight distributions and multimodal GPC curves are obtained. The chemical composition of the polyether-siloxanes used according to the invention as chain starters for the alkoxylation is therefore very complex. In addition, these copolymers contain by-products and catalyst residues from the hydrosilylation which cannot be separated off. These by-products and in particular catalyst residues represent potential catalyst poisons in the alkoxylation according to the invention by means of DMC catalysts. Polyether-siloxanes cannot be alkoxylated selectively to chain-extended products by the conventional route of alkali or acid catalysis. The strongly basic or acidic reaction conditions and the use of water in the subsequent neutralization and work-up stage unavoidably lead to rearrangements and to a reorganization of the siloxane framework which is very difficult to control.

In contrast, under the approximately neutral and water-free reaction conditions of the DMC-catalysed alkoxylation, it is possible to use even hydrolysis-sensitive compounds such as silanols bearing SiOH groups or OH-functional silicone-polyethers to give the siloxane framework as starter for the formation of higher molecular weight silicone-polyether copolymers. According to previous opinion in the art, the process of DMC catalysis suffers from a critical limitation when mixtures having a complex composition and comprising species which are reactive towards epoxides and have very different chain lengths are to be alkoxylated in admixture. A person skilled in the art will know the term "catch-up kinetics" to describe the phenomenon that, unlike in the case of conventional base or acid catalysis, the reactivity towards the addition reaction of alkylene oxide depends greatly on the molar mass of the OH-functional starter compounds. Thus, it is known that low molecular weight chains are significantly more reactive than higher molecular weight chains. The preference for low molecular weight species is so pronounced that, according to the state of knowledge hitherto, when alkylene oxide is introduced the epoxide monomer or monomers add onto virtually only the shortest-chain reactive components in the respective reaction mixture. The nonuniform alkylene oxide addition reaction known in the case of DMC catalysis thus leads to nonuniform chain growth.

In view of the considerable molar mass differences when industrial polyether-siloxanes in which free polyethers having average molar masses of usually <4000 g/mol are present side by side with silicone-polyethers having molar masses of usually 10 000-50 000 g/mol are used as chain starters, it would therefore be expected that in the case of the DMC-catalysed alkoxylation virtually all alkylene oxide would add onto the very low molecular weight free polyether component.

It was therefore all the more surprising to discover that even industrial silicone-polyether copolymers can be subjected to a ring-opening alkoxylation reaction over double metal cyanide catalysts in which both the polyether-siloxane copolymers and the free polyether components function as OH-functional chain starters regardless of their different hydrophilicity or hydrophobicity and molar masses. This result is completely unexpected to a person skilled in the art because it contradicts the conventional wisdom of the general validity of "catch-up kinetics" in the case of DMC catalysts.

Silicone-polyether copolymers used for the purposes of the present invention are those which have at least 5 repeating units of the ether fragment (in formula (Ia) denoted by the index e) in the polyether part and/or have a mean molar mass of the polyether fragment of at least 220 g/mol. The molecular mass of the repeating units is between 44 and 125 g/mol, this is equivalent to all relevant alkylene oxides starting from ethylene oxide to styrene oxide.

The specific and unusual kinetics with which the DMC-catalysed addition of alkylene oxides onto the different OH-functional compounds of the complex starting mixture takes place are very particularly surprising and quite unforeseeable. During the course of the introduction of alkylene oxide, both the chain length of the free excess polyethers and the chain length of the polyether chains bound to the siloxane increase at a rate characteristic of the respective system. This contradicts the "catch-up kinetics" known to those skilled in the art from DMC-based alkoxylation of, for example, alcohols or polyetherols and the fundamental statement made, for example, in EP 1 942 126 A1 (US 2008-0167501) that it is virtually exclusively the more reactive short-chain species which react in a mixture of OH-functional starters having different molecular weights. According to EP 1 942 126 A1 (US 2008-0167501), double metal cyanide catalysts in principle have a pronounced preference for the lowest molecular weight hydroxyl-bearing components in a mixture of reactive species.

It has now surprisingly been found that in the DMC-catalysed alkoxylation the alkylene oxides do not predominantly add onto the low molecular weight free excess polyethers but also onto the very much higher molecular weight polyether-siloxanes bearing reactive OH groups. In this way, mixtures which have a hitherto unachievable novel composition and contain silicone-polyether copolymers having hydrophobic and hydrophilic structural elements and polyethers are formed.

It is clear from GPC analyses as shown in FIG. 1, Example 5, that all OH-bearing components of the polyether-siloxane participate in the alkoxylation reaction. However, as a result of the chain length of the siloxane-bonded polyether segments increasing at a different rate than that of the free excess polyethers, novel polyether-siloxane systems are formed. The characteristic chain growth of the reactive species becomes clear in GPC analyses in the form of the relative shift in the peaks along the molar mass axis.

FIG. 1 (Example 5) shows the chain growth of all OH-functional components of a polyether-siloxane which is typical of the process of the invention in the stepwise addition of propylene oxide. The chain starter in FIG. 1 is a polyether-siloxane which was prepared beforehand by hydrosilylation of a hydrogensiloxane of the formula (I) having the structure $m^1=42$, $m^2=6$, $m^3=m^4=0$, $X=X^1=$methyl with a 35 equivalent-% excess (based on the SiH groups) of an OH-terminated allyl polyether having an average molar mass of 600 g/mol and comprising 50% by weight of ethylene oxide units and 50% by weight of propylene oxide units according to the prior art. The GPC analysis of this starter is characterized by two maxima at about 600 g/mol for the free polyether component and at about 9000 g/mol for the polyether-siloxane. After introduction of a first partial amount of propylene oxide according to the process of the invention, the two maxima shift to higher molar masses. A product 1 in which the free polyether has grown to an average molar mass of about 2700 g/mol and the silicone-polyether copolymer has grown to a maximum at about 18 000 g/mol is obtained. On further addition of propylene oxide, the trend and the general chain growth of all reactive species in the system continues. The product 2 contains the free polyether which has been lengthened to an average molar mass of about 13 000 g/mol and a silicone-polyether copolymer having a maximum at 22 000 g/mol and very high molecular weight copolymer components of more than 100 000 g/mol.

The process of the invention makes it possible for the first time to modify a silicone-polyether which has been obtained in a conventional fashion fundamentally and with retention of the siloxane framework by means of subsequent alkoxylation reaction.

A process for the alkoxylation of silicone-polyether copolymers in which double metal cyanide catalysts are used is thus provided.

It makes it possible to synthesize, for example, polysiloxane-polyether copolymer systems having very much longer, possibly functionalized polyether chains. In addition, the mass ratio of free excess polyethers to the silicone-polyether copolymer can be varied from that of the starting copolymer. In the same way, the chemical structure of the free polyether or the polyether bound to the siloxane can be varied and, for example, the average molar mass of the silicone-polyether copolymer relative to the average molar mass of the excess of polyether can thus also be controlled.

In the process of the invention, compositions containing silicone-polyether copolymers are thus alkoxylated over double metal cyanide catalysts to form silicone-polyether copolymer compositions having an average molar mass which has been increased over that of the starting materials. Preferential alkoxylation of silicone-polyether copolymers in compositions containing free polyetherols occurs over double metal cyanide catalysts in the process of the invention, with the increase in the average molar mass of the silicone-polyether copolymer used in admixture with free polyetherol increasing at least the same rate as the increase in the molar mass of the free polyetherol present in the starting mixture.

The preferential alkoxylation of the silicone-polyether copolymers in compositions containing free polyetherols shows that the increase in the average molar mass of the silicone-polyether copolymer used in admixture with free polyetherol occurs with at least the same reaction probability as the increase in the molar mass of the free polyetherol present in the starting mixture. The growth of the silicone-polyether copolymers usually occurs more quickly than the increase in the molar mass of the polyetherol.

According to the invention, the rate of the alkoxylation of all silicone-polyether copolymers participating in the reaction is greater than or equal to the rate of the alkoxylation of the polyetherol.

The novel process creates new opportunities for adjusting the hydrophile/hydrophobe ratio and thus quite novel options for the development of surfactants.

A further particular advantage of the process of the invention is the great robustness of the alkoxylation process by means of which novel, high molecular weight and highly functionalized polyether-siloxanes are provided. The alkoxylated silicone-polyether copolymers can thus have relatively high molecular weight and highly functionalized, hydrophobic and hydrophilic structural elements having complex compositions.

The process claimed according to the invention makes it possible to react SiC-bonded polyether-siloxanes which have a wide variety of structures, molar masses and molar mass distributions and have at least one reactive carbon-bonded hydroxyl group with epoxide monomers and, if appropriate, further monomers in an if appropriate ring-opening alkoxylation reaction in the presence of a DMC catalyst to form chain-extended, modified polyether-siloxanes.

The process of the invention makes it possible to address a fundamental need in the chemistry of relatively high molecular weight SiC-based silicone-polyether copolymers. With increasing chain length and correspondingly increasing molecular weight, the reactivity of allyl polyethers in the hydrosilylation reaction decreases greatly compared to corresponding short-chain polyethers. As a result, the reaction rate decreases and the achievement of a quantitative SiH conversion is made considerably more difficult or even impossible. The formation of polyether-siloxanes having relatively high molecular weight polyether components is therefore not at all ensured via the customary addition onto siloxanes having SiH groups.

A process for preparing alkoxylation products containing polyether-siloxanes by means of DMC catalysis, in which one or more epoxide-functional monomers of the formula (II) are added either individually or in admixture with further epoxide compounds of the formula (III) and, if appropriate, further comonomers such as lactones (IV), cyclic anhydrides (V), (VI), carbon dioxide or oxetanes, either in blocked or randomly, onto an organosiloxane chain starter of the formula (I) or (VII) having at least one reactive hydrogen is thus provided.

A further objective of the process of the invention is to retain the advantages of a high reaction rate and the omission of catalyst deactivation and removal which are known for double metal cyanide systems and to preserve the hydrolysis-sensitive siloxane framework under the conditions of the selective DMC-catalysed alkoxylation.

Starter compounds for the purposes of the process of the invention are polyether-siloxanes of the formula (I) which bear at least one OH group,

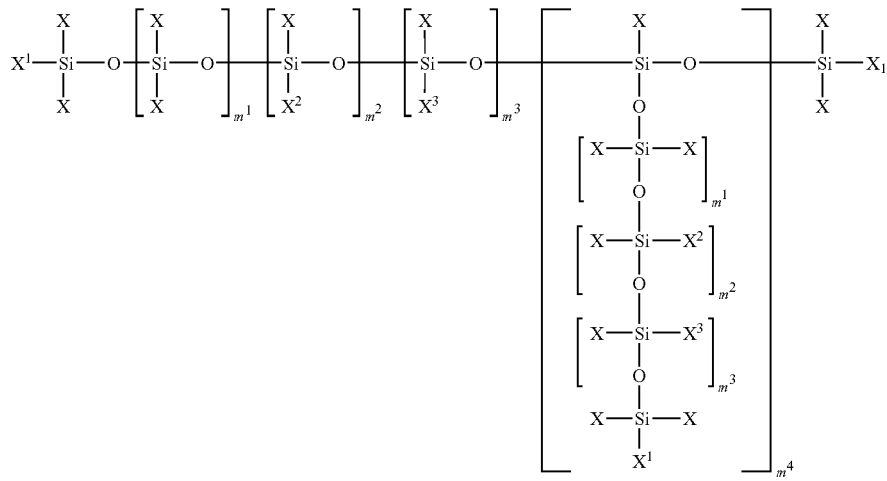

(I) - see also Fig. 1 where
$m^1$ is independently an integer from 0 to 500, preferably from 10 to 200, in particular from 15 to 100,
$m^2$ is independently an integer from 0 to 60, preferably from 0 to 30, in particular from 0 to 25,
$m^3$ is independently an integer from 0 to 60, preferably from 0 to 30, in particular from 0 to 25,
$m^4$ is an integer from 0 to 10, preferably from 0 to 3,
X is a linear, cyclic or branched, aliphatic or aromatic, saturated or unsaturated hydrocarbon radical which has from 1 to 20 carbon atoms and may optionally contain heteroatoms such as oxygen, nitrogen, phosphorus or sulphur but is preferably a methyl group,
$X^1$ can be either X, $X^2$ or $X^3$,
$X^2$ is an OH-functional, optionally ester- or carbonate-modified polyoxyalkylene radical of the formula (Ia),

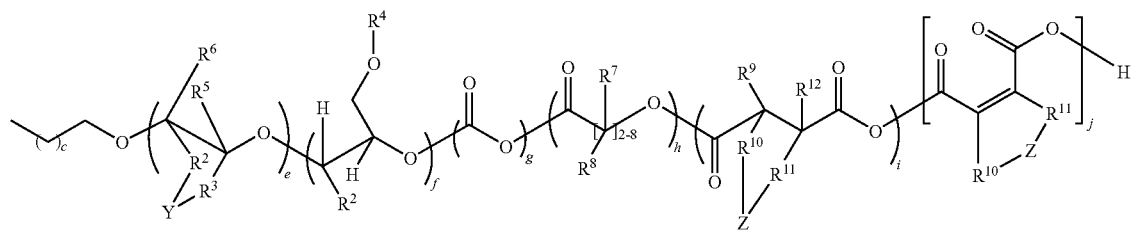

(Ia) - see also Fig. 2

$X^3$ is a terminally etherified polyoxyalkylene radical of the formula (Ib)

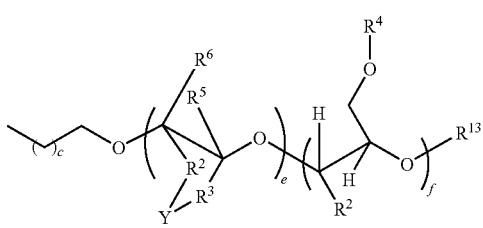

(Ib)

or a polyoxyalkylene radical of the formula (Ic) which has been terminally esterified with a monofunctional carboxylic acid,

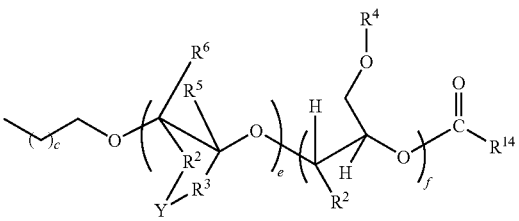

(Ic)

where
$R^4$ is a linear or branched alkyl radical which has from 1 to 24 carbon atoms and is bound to an aromatic or cycloaliphatic radical,
$R^7$ and $R^8$ are each, independently of one another, either hydrogen or an alkyl, alkoxy, aryl or aralkyl group,
$R^9$, $R^{10}$, $R^{11}$ and $R^{12}$ are each, independently of one another, either hydrogen or an alkyl, alkenyl, alkoxy, aryl or aralkyl group, with the hydrocarbon radical being able to be cycloaliphatically or aromatically bridged via the fragment Z, where Z can be either a divalent alkylene radical or alkenylene radical,
$R^{13}$ can be an alkyl group having from 1 to 18 carbon atoms, preferably methyl,
$R^{14}$ is a saturated or monounsaturated or polyunsaturated, either linear or branched, aliphatic or aromatic hydrocarbon radical which has 1-30 carbon atoms and may bear OH groups and is preferably a methyl radical, and
c is an integer from 0 to 24, preferably from 0 to 12, particularly preferably from 0 to 8, very particularly preferably from 0 to 4, e is an integer greater than 5, preferably from 6 to 500, particularly preferably from 6 to 300 and in particular from 6 to 200, and f, g, h, i and j are integers from 0 to 500, preferably from 0 to 300, particularly preferably from 0 to 200, in particular from 0 to 100.

The polyether-siloxanes described by the formula (I) include the proportions of free excess polyethers present as a result of the process.

The various monomer units within the siloxane chain or within the polyether chain attached thereto can be arranged either in blocks or randomly. The indices shown in the formulae described here and the value ranges of the indices indicated are the averages of the possible random distribution of the actual isolated structures and/or mixtures thereof. This also applies to structural formulae shown in precise terms.

SiC-bonded polyether-siloxanes of the formula (I) are prepared industrially by noble metal-catalysed hydrosilylation reactions of the corresponding hydrogen-siloxanes with terminally unsaturated polyethers based on, for example, allyl alcohol. Such polyethers are prepared in a separate preceding alkoxylation process according to the prior art by alkoxylation of allyl alcohol by means of alkylene oxides and possibly additional comonomers by means of which ester or carbonate groups can be built into the polyether framework. The free excess polyethers present as by-products in the industrial polyether-siloxanes (I) do not adversely affect the DMC-catalysed alkoxylation reaction according to the invention. If these excess polyethers are OH-functional, they likewise function as chain starters for the reaction with epoxide monomers in the alkoxylation process.

Apart from the SiC-bonded polyether-siloxanes of the formula (I), it is also possible to use linear, terminally OH-functional, SiOC-bonded polyether-siloxanes which can be obtained by direct alkoxylation of α,ω-dihydroxysiloxanes bearing SiOH groups by means of epoxide monomers and whose preparation is described in the document DE 10 2008 002713.8, which is not a prior publication, as chain starters. With regard to these chain starters, the disclosure content of DE 10 2008 002713.8 is fully incorporated by reference into the present patent application.

In addition, hydroxyl-containing organosiloxanes having a cyclic structure corresponding to the formula (VII) are also suitable as starters for the DMC-catalysed alkoxylation according to the invention,

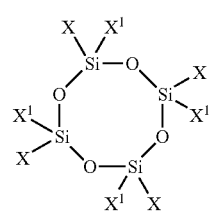

(VII)

where $X^1$ corresponds to the OH-functional organic radical $X^2$ in at least one case per molecule. The cyclic copolymers described by formula (VII) include the proportions of free excess polyethers which are present as a result of the process.

As epoxide monomers, it is possible to use alkylene oxides of the general formula (II),

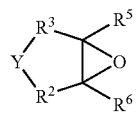

(II)

where $R^2$ or $R^3$ and $R^5$ or $R^6$ are each, independently of one another, H or a saturated or either monounsaturated or polyunsaturated, either monovalent or polyvalent hydrocarbon radical which may be further substituted, with the radicals $R^5$ or $R^6$ being a monovalent hydrocarbon radical. The hydrocarbon radical can be bridged cyclo-aliphatically via the fragment Y; Y can be absent or can be a methylene bridge having 1 or 2 methylene units; when Y is 0, the radicals $R^2$ and $R^3$ are each, independently of one another, a linear or branched radical having from 1 to 20, preferably from 1 to 10, carbon atoms, particularly preferably a methyl, ethyl, propyl or butyl, vinyl, allyl or phenyl radical. Preference is given to at least one of the two radicals $R^2$ or $R^3$ in formula (II) being hydrogen. As alkylene oxides, particular preference is given to using ethylene oxide, propylene oxide, 1,2- or 2,3-butylene oxide, isobutylene oxide, 1,2-dodecene oxide, styrene oxide, cyclohexene oxide (in this case $R^2$—$R^3$ is a —CH$_2$CH$_2$CH$_2$CH$_2$— group, Y is therefore —CH$_2$CH$_2$—) or vinylcyclohexene oxide or mixtures thereof. The hydrocarbon radicals $R^2$ and $R^3$ in formula (II) can in turn be substituted further and bear functional groups such as halogens, hydroxyl groups or glycidyloxypropyl groups. Such alkylene oxides include epichlorohydrin and 2,3-epoxy-1-propanol. It is also possible to use mixtures of epoxides of the formula (II), either in a blockwise fashion or as mixtures.

It is likewise possible to use glycidyl compounds such as glycidyl ethers and/or glycidyl esters of the general formula (III),

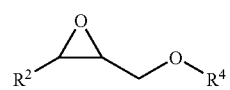

(III)

where at least one glycidyloxypropyl group is bound via an ether or ester function to a radical $R^4$ which may be a linear or branched alkyl radical having from 1 to 24 carbon atoms or an aromatic or cycloaliphatic radical, in combination with the alkylene oxides represented by formula (II). This class of compounds includes, for example, allyl, butyl, 2-ethylhexyl, cyclohexyl, benzyl, $C_{12}/C_{14}$-fatty alcohol, phenyl, p-tert-butylphenyl or o-cresyl glycidyl ether. Preferred glycidyl esters are, for example, glycidyl methacrylate, glycidyl acrylate and glycidyl neodecanoate. It is likewise possible to use polyfunctional epoxide compounds such as 1,2-ethyl, 1,4-butyl or 1,6-hexyldiglycidyl ether.

The alkylene oxides of the formula (II) which can be used according to the invention can, if appropriate in combination with further epoxides of the formula (III), also be used under the conditions of DMC-catalysed alkoxylation in admixture with lactones of the formula (IV),

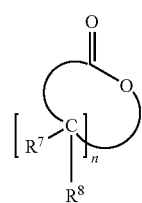

(IV)

where n is an integer from 2 to 8 and $R^7$ and $R^8$ are each, independently of one another, either hydrogen or an alkyl, alkoxy, aryl or aralkyl group. Suitable lactones which can be used in this context are, for example, ε-caprolactone, δ-valerolactone and γ-butyrolactone and also mixtures of various lactones. Preference is given to using ε-caprolactone as comonomer. During the alkoxylation process, the respective epoxide and lactone monomers can be copolymerized in any order and in variable amounts either in succession or in parallel to form polyether esters having a blockwise or random sequence of the individual monomer building blocks.

As an alternative to or in addition to lactones, it is also possible to use saturated, unsaturated or aromatic cyclic dicarboxylic anhydrides of the formulae (V) and (VI) as comonomers in addition to the epoxides of the formula (II) and if appropriate further epoxides of the formula (III) which can be used according to the invention under the conditions of the DMC-catalysed alkoxylation,

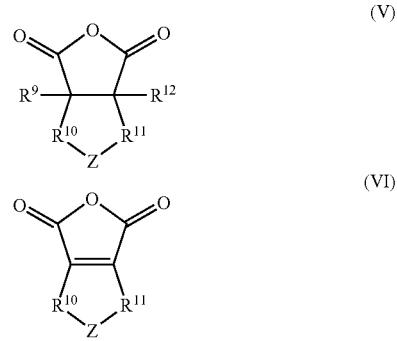

where $R^9$, $R^{10}$, $R^{11}$, and $R^{12}$ are each, independently of one another, hydrogen or an alkyl, alkenyl, alkoxy, aryl or aralkyl group. The hydrocarbon radical can be cycloaliphatically or aromatically bridged by the fragment Z, where Z can be either a divalent alkylene radical or alkenylene radical. Preferred cyclic anhydrides are succinic anhydride, oct(en)ylsuccinic, dec(en)ylsuccinic and dodec(en)ylsuccinic anhydride, maleic anhydride, phthalic anhydride, hexahydrophthalic, tetrahydrophthalic, dihydrophthalic, methylhexahydrophthalic and methyltetrahydrophthalic anhydride. During the alkoxylation process, the respective anhydride monomers can be copolymerized in any order and in variable amounts, either in succession or in parallel with the epoxide feed with ring opening to form polyether esters. Mixtures of anhydrides of the formula (V) and (VI) can also be used.

If the alkoxylation of polyether-siloxanes of the formula (I) is carried out in the presence of carbon dioxide, polyethers or polyether esters modified with carbonate groups can be prepared by insertion of carbon dioxide into the polymer chain. Such reactions are preferably carried out in autoclave reactors under superatmospheric pressure and an atmosphere of carbon dioxide. The carbonate content is variable and can be controlled, for example, by selection of the temperature and pressure conditions during the reaction.

To start the alkoxylation reaction according to the process of the invention, the starter mixture comprising one or more OH-functional starter compounds of the formula (I) or (VII) or the polyether-siloxanes described in DE 10 2008 002713.8, which is not a prior publication, and the double metal cyanide catalyst, which may, if appropriate, have been slurried in a suspension medium beforehand, is placed in the reactor. As suspension medium, it is possible to use either a polyether, a polyether-siloxane or an inert solvent or advantageously one or more of the abovementioned starter compounds, or alternatively a mixture of the components mentioned. At least one of the epoxide compounds of the formula (II) or (III) is added to the initially charged starter mixture. To start the alkoxylation reaction and to activate the double metal cyanide catalyst, only part of the total amount of epoxide to be introduced is usually added at first. The molar ratio of epoxide to the reactive groups of the starter, in particular the OH groups in the starter mixture, is preferably 0.1-300:1, more preferably 0.2-200:1, in particular 0.4-100:1, during the start phase. It can be advantageous to remove any materials which inhibit the reaction from the reaction mixture, e.g. by distillation, before addition of the epoxide.

The commencement of the exothermic reaction can be detected, for example, by monitoring pressure and/or temperature. A sudden drop in the pressure in the reactor indicates, in the case of gaseous alkylene oxides, that the alkylene oxide is being incorporated, the reaction has thus started and the end of the start phase has been reached.

After the initialization of the reaction, either further starter compound together with further epoxide or further epoxide alone are/is introduced as a function of the desired molar mass. As an alternative, a mixture of different epoxides of the formulae (II) and (III) can also be added on. The epoxide monomers of the formulae (II) and (III) can be added on in succession in any order. The reaction can be carried out in an inert solvent, for example to reduce the viscosity of the reaction mixture. Suitable inert solvents are hydrocarbons, in particular toluene, xylene or cyclohexane.

The molar ratio of the sum of the epoxides introduced, including the epoxides already added in the start phase, based on the starter compound used, in particular based on the number of OH groups of the starter compound used, is preferably $1-10^5:1$, in particular $1-10^4:1$.

The addition reaction of the epoxide compounds preferably takes place at a temperature of from 60 to 250° C., particularly preferably at a temperature of from 90 to 160° C. The pressure is preferably from 0.02 bar to 100 bar absolute, particularly preferably from 0.05 to 20 bar absolute and in particular from 0.2 to 2 bar absolute. Carrying out the alkoxylation at subatmospheric pressure enables the reaction to be carried out very safely. If appropriate, the alkoxylation can be carried out in the presence of an inert gas (e.g. nitrogen) or, to prepare polyether carbonates, in the presence of carbon dioxide even at a superatmospheric pressure of preferably from 1 to 20 bar absolute.

The lactones (IV) or cyclic anhydrides (V) and (VI) which can be used for preparing ester-modified polyether-siloxanes can both be added to the starter/catalyst mixture at the beginning in the start phase and/or be introduced in parallel to the epoxide at a later point in time. The introduction of the comonomers mentioned into the reactor can also alternate with the introduction of epoxides.

The molar ratio of the epoxide monomers to cyclic anhydrides can be varied. It is usual to use at least equimolar amounts of epoxide monomers based on anhydrides. Preference is given to using the epoxides in a molar excess in order to ensure complete conversion of anhydrides. Lactones can be added during the alkoxylation either in a substoichiometric amount or an excess based on the epoxide monomers.

To prepare carbonate-modified polyether-siloxanes, the alkoxylation takes place in the presence of either gaseous carbon dioxide or solid carbon dioxide introduced as dry ice. Preference is given to using carbon dioxide gas which can be introduced into the system composed of starter and DMC catalyst before the start of the reaction, i.e. during the initialization stage, and/or during the subsequent phase during which epoxide monomers and any further comonomers are fed in. To increase the carbonate content in the end product, it is advantageous to feed in further carbon dioxide either continuously or in portions as a function of the carbon dioxide consumption, which can be seen from the pressure decrease in the autoclave, during the reaction. The reaction preferably occurs at pressures of less than 100 bar, particularly preferably less than 20 bar.

After the monomer addition and possible after-reaction to complete the monomer conversion, any residues of unreacted monomer still present and any further volatile constituents are removed, usually by vacuum distillation, gas stripping or other methods of deodorization. The removal of volatile secondary components can be carried out either batchwise or continuously. In the process of the invention which is based on DMC catalysis, filtration can normally be omitted.

The process steps can be carried out at identical or different temperatures. The mixture of starting substance, DMC catalyst and, if appropriate, suspension medium which is placed in the reactor at the beginning of the reaction can, according to the teaching of WO 98/52689 (U.S. Pat. No. 5,844,070), be pretreated by stripping before introduction of monomer is commenced. Here, an inert gas is introduced into the reaction mixture via the feed line to the reactor and volatile components are removed from the reaction mixture by application of a reduced pressure with the aid of a vacuum unit connected to the reactor system. In this simple way, materials which can inhibit the catalyst, e.g. lower alcohols or water, can be removed from the reaction mixture. The addition of inert gas and the simultaneous removal of the volatile components can be advantageous, particularly during start-up of the reaction since inhibiting compounds can also get into the reaction mixture via the addition of the reactants or as a result of secondary reactions.

As DMC catalyst, it is possible to use all known DMC catalysts, preferably those which contain zinc and cobalt, more preferably those comprising zinc hexacyanocobaltate (III). Preference is given to using the DMC catalysts described in U.S. Pat. No. 5,158,922, US 20030119663, WO 01/80994 (U.S. Pat. No. 6,835,687) or in the above-mentioned documents. The catalysts can be amorphous or crystalline. The catalyst concentration in the reaction mixture is preferably from >0 to 1000 wppm (ppm by mass), preferably from >0 to 500 wppm, particularly preferably from 0.1 to 200 wppm and very particularly preferably from 1 to 50 wppm. This concentration is based on the total mass of the silicone-polyether copolymer systems formed.

The catalyst is preferably introduced only once into the reactor. The amount of catalyst is set so that a catalyst activity sufficient for the process is ensured. The catalyst can be introduced as solid or in the form of a catalyst suspension. If a suspension is used, starters of the formulae (I) and (VII) or the polyether-siloxanes described in DE 10 2008 002713.8, which is not a prior publication, are particularly suitable as suspension media. However, use of a suspension is preferably dispensed with.

The process of the invention produces high molecular weight polyether-siloxane copolymer systems which can be prepared reproducibly and in a targeted manner in respect of the structure and molar mass. The sequence of monomer units can be varied within wide limits. Epoxide monomers of the types (II) and (III) and lactones of the formula (IV) can be arranged in blocks in any desired way or be randomly incorporated into the polymer chain. The fragments inserted by the reaction with ring opening of the reaction components of the formulae (II) to (VI) into the polymer chain being formed can be present in any permutations in terms of their sequence, with the proviso that cyclic anhydrides of the formulae (V) and (VI) and also carbon dioxide are inserted randomly, i.e. not in homologous blocks, into the polyether structure.

Moreover, desired polydispersity (Mw/Mn) can be achieved by the process of the invention. In one embodiment of the invention, Mw/Mn can range from about 1.1:1 to about 6:1, preferably from about 1.1:1 to about 4:1.

As reactors for the reaction claimed according to the invention, it is in principle possible to use all suitable types of reactor which allow the reaction and its possible evolution of heat to be controlled. The reaction can be carried out continuously, semicontinuously or batchwise in a manner known in process engineering and can be matched flexibly to the production facilities available. Apart from conventional stirred tank reactors, it is also possible to use jet loop reactors with a gas phase and internal heat-exchange tubes, as described in WO 01/062826 (U.S. Pat. No. 6,667,972). In addition, gas-phase-free loop reactors can be used.

In the introduction of the starting materials, good distribution of the materials participating in the chemical reaction, i.e. the epoxide monomers, starters, DMC catalyst and, if appropriate, suspension media or comonomers such as lactones, anhydrides or carbon dioxide, is necessary.

The invention further provides the silicone-polyether copolymers prepared by the processes described and also plastic articles produced therefrom and surfactant compositions containing the silicone-polyether copolymers, including their use.

Further subjects of the invention are described by the claims. The disclosure content of the claims is fully incorporated by reference into the description.

The process of the invention for the DMC-catalysed alkoxylation of polyether-siloxanes having reactive hydrogen atoms is described by way of example below, without the invention being restricted to these illustrative embodiments.

If ranges, general formulae or classes of compounds are indicated in the following, these encompass not only the respective ranges or groups of compounds which are explicitly mentioned but also all subranges and subgroups of compounds which can be obtained by leaving out individual values (ranges) or compounds.

BRIEF DESCRIPTION OF THE DRAWINGS

FIG. 1 is larger depiction of the structure of formula I.
FIG. 2 is a larger depiction of the structure of formula Ia.

FIG. 3 shows the change in the GPC analysis during the course of the reaction.

EXAMPLES

In the examples presented below, the present invention is described by way of example without the invention, whose scope is defined by the total description and the claims, being restricted to the embodiments mentioned in the examples.

OH numbers were determined by the standard acetylation method (phthalic anhydride). GPC analyses were carried out in THF as solvent against polypropylene glycol as standard.

The polyether-siloxanes used as starting materials in Examples 1-3 and 5 and obtained by a hydrosilylation reaction contain, as a result of their method of preparation, a proportion of excess polyether which is required to complete the Si—H reaction. The proportion of the excess polyether which is concomitantly used is noted when the respective amounts used in the examples is stated.

Example 1

As chain starter, use is made of a polyether-siloxane of the formula (I) having the structure $m^1=20$, $m^2=5$, $m^3=m^4=0$, $X=X^1=$methyl which has been prepared beforehand by hydrosilylation of a hydrogensiloxane using an excess of an OH-terminated allyl polyether having an average molar mass of 800 g/mol and comprising 36% by weight of ethylene oxide units and 64% by weight of propylene oxide units according to the state of the art.

200.0 g of this polyether-siloxane (containing 15-20% by weight of excess polyether having an average molar mass of 800 g/mol) and 0.10 g of zinc hexacyanocobaltate DMC catalyst are placed under nitrogen in a 3 liter autoclave and heated to 130° C. while stirring. The reactor is evacuated to an internal pressure of 30 mbar in order to remove any volatile constituents present by distillation. To activate the DMC catalyst, a portion of 40.0 g of propylene oxide is introduced. After 15 minutes and commencement of the reaction (pressure drop in the interior of the reactor), a further 760.0 g of propylene oxide are fed in continuously and with cooling at 130° C. and a maximum internal pressure in the reactor of 0.6 bar absolute over a period of 2 hours. The 30 minute after-reaction at 130° C. is followed by the degassing stage. Here, volatile components such as residual propylene oxide are distilled off under reduced pressure. The finished medium-viscosity and colourless polyether-siloxane copolymer is cooled to below 80° C. and drained from the reactor.

The product contains an average of 5 long polyether chains which are chemically bound to the siloxane framework via an SiC bond per polyether-siloxane molecule and has an OH number of 11.1 mg KOH/g. The GPC shows a multimodal curve having maxima at about 5000, 9000 and 20 000 g/mol, a mass average molar mass $M_w$ of 14 300 g/mol and a polydispersity $M_w/M_n$ of 1.63.

Example 2

As chain starter, a polyether-siloxane prepared by hydrosilylation and having the structure $m^1=61.5$; $m^2=1.6$; $m^3=4.9$; $m^4=0$, $X=X^1=$methyl, which has been prepared using a mixture of a terminally OH-functional allyl polyether and two methyl-capped allyl polyethers, whose composition is as follows:

a) 18% by weight of ethylene oxide, 82% by weight of propylene oxide, 1400 g/mol, $R^{13}$ in formula (Ib)=methyl,
b) 74% by weight of ethylene oxide, 26% by weight of propylene oxide, 3800 g/mol, $R^{13}$ in formula (Ib)=methyl,
c) 42% by weight of ethylene oxide, 58% by weight of propylene oxide, 3800 g/mol is used in a mass ratio of 41:17:42.

162.0 g of this polyether-siloxane (containing about 20% by weight of excess polyether mixture) and 0.024 g of zinc hexacyanocobaltate DMC catalyst are placed under nitrogen in a 3 liter autoclave and heated to 130° C. while stirring. The reactor is evacuated to an internal pressure of 30 mbar in order to remove any volatile constituents present by distillation. To activate the DMC catalyst, a portion of 20.0 g of propylene oxide is introduced. After 12 minutes and commencement of the reaction, a further 62.0 g of propylene oxide are fed in continuously and with cooling at 130° C. and a maximum internal pressure in the reactor of 0.3 bar absolute over a period of 40 minutes. After an after-reaction at 130° C. for 40 minutes, degassing is carried out. Here, volatile components such as residual propylene oxide are distilled off under reduced pressure. The finished medium-viscosity and colourless polyether-siloxane copolymer is cooled to below 80° C. and drained from the reactor.

The product contains an average of 6.5 long polyether chains which are chemically bound to the siloxane framework via an SiC bond per polyether-siloxane molecule and has an OH number of 4.9 mg KOH/g. The GPC shows a multimodal curve having maxima at about 1400, 9000 and 20 000 g/mol, a mass average molar mass $M_w$ of 16 300 g/mol and a polydispersity $M_w/M_n$ of 2.32.

Example 3

As chain starter, use is made of a polyether-siloxane prepared by hydrosilylation and having the structure $m^1=61.5$; $m^2=6.5$; $m^3=m^4=0$, $X=X^1=$methyl, which has been prepared using a mixture of three terminally OH— functional allyl polyethers, whose composition is as follows:

a) 10% by weight of ethylene oxide, 90% by weight of propylene oxide, 1500 g/mol,
b) 58% by weight of ethylene oxide, 42% by weight of propylene oxide, 1300 g/mol,
c) 42% by weight of ethylene oxide, 58% by weight of propylene oxide, 3800 g/mol in a mass ratio of 36:6:58.

159.0 g of this polyether-siloxane (containing about 20% by weight of excess polyether mixture) and 0.031 g of zinc hexacyanocobaltate DMC catalyst are placed under nitrogen in a 3 liter autoclave and heated to 130° C. while stirring. The reactor is evacuated to an internal pressure of 30 mbar in order to remove any volatile constituents present by distillation. To activate the DMC catalyst, a portion of 21.0 g of propylene oxide is introduced. After 12 minutes and commencement of the reaction, a further 177.0 g of propylene oxide are fed in continuously and with cooling at 130° C. and a maximum internal pressure in the reactor of 0.5 bar absolute over a period of 45 minutes. After an after-reaction at 130° C. for 35 minutes, degassing is carried out. Here, volatile components such as residual propylene oxide are distilled off under reduced pressure. The finished medium-viscosity and colourless polyether-siloxane copolymer is cooled to below 80° C. and drained from the reactor.

The product contains an average of 6.5 long polyether chains which are chemically bound to the siloxane framework via an SiC bond per polyether-siloxane molecule and has an OH number of 10.8 mg KOH/g. The GPC shows a bimodal curve having maxima at about 8000 and 30 000 g/mol, a mass average molar mass $M_w$ of 8600 g/mol and a polydispersity $M_w/M_n$ of 2.36.

Example 4

As chain starter, use is made of a linear polyether-siloxane which has been prepared beforehand by propoxylation of an α,ω-dihydroxypolydimethylsiloxane having an average chain length of 51 $Si(CH_3)_2O$ units and whose two OH-terminated polyether chains have an average molar mass of about 600 g/mol each.

250.0 g of this polyether-siloxane and 0.023 g of zinc hexacyanocobaltate DMC catalyst are placed under nitrogen in a 3 liter autoclave and heated to 130° C. while stirring. The reactor is evacuated to an internal pressure of 30 mbar in order to remove any volatile constituents present by distillation. To activate the DMC catalyst, a portion of 36.0 g of propylene oxide is introduced. After 15 minutes and commencement of the reaction, a further 485.0 g of propylene oxide are fed in continuously and with cooling at 130° C. and a maximum internal pressure in the reactor of 0.5 bar absolute over a period of 1.5 hours. The 30 minute after-reaction at 130° C. is followed by the degassing stage. Here, volatile components such as residual propylene oxide are distilled off under reduced pressure. The finished medium-viscosity and slightly turbid polyether-siloxane copolymer is cooled to below 80° C. and drained from the reactor.

The product contains an average of 2 long terminal polyether chains which are chemically bound to the siloxane framework via an SiOC bond per polyether-siloxane molecule and has an OH number of 7.2 mg KOH/g. The GPC shows a maximum at about 15 000 g/mol and a polydispersity $M_w/M_n$ of 1.42.

Example 5

As chain starter, use is made of a polyether-siloxane of the formula (I) having the structure $m^1=42$, $m^2=6$, $m^3=m^4=0$, $X=X^1$=methyl which has been prepared beforehand by hydrosilylation of the corresponding hydrogensiloxane using an excess of an OH-terminated allyl polyether having an average molar mass of 600 g/mol and comprising 50% by weight of ethylene oxide units and 50% by weight of propylene oxide units according to the prior art.

150.0 g of this polyether-siloxane (containing 15-20% by weight of excess polyether having an average molar mass of 600 g/mol) and 0.16 g of zinc hexacyanocobaltate DMC catalyst are placed under nitrogen in a 3 liter autoclave and heated to 130° C. while stirring. The reactor is evacuated to an internal pressure of 30 mbar in order to remove any volatile constituents present by distillation. To activate the DMC catalyst, a portion of 40.0 g of propylene oxide is introduced. After 15 minutes and commencement of the reaction, firstly a further 296 g of propylene oxide (sampling, product 1) and then a further 2250 g of propylene oxide are introduced continuously and with cooling at 130° C. and a maximum internal pressure in the reactor of 0.6 bar absolute over a period of 3.45 h. The 30 minute after-reaction at 130° C. is followed by the degassing stage. Here, volatile components such as residual propylene oxide are distilled off under reduced pressure. The finished medium-viscosity and yellowish polyether-siloxane copolymer (product 2) is cooled to below 80° C. and drained from the reactor.

The product has an OH number of 4.2 mg KOH/g. The GPC (Image 1) shows a multimodal curve whose maxima shift continuously to higher molar masses during the course of the alkoxylation reaction. The mass average molar mass $M_w$ of the end product (product 2) is 35 450 g/mol and the polydispersity $M_w/M_n$ is 1.6.

FIG. 3 shows the change in the GPC analysis during the course of the reaction. All maxima move along the X axis to higher average molar masses. A preferential reaction in the alkoxylation according to catch-up kinetics, as would have been expected for the short-chain polyetherols, is not observed. The "falsification" caused by the logarithmic depiction of the molar mass scale standardized in GPC analyses is indicated only at the margin.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. A process for the alkoxylation of SiC-bonded silicone-polyether copolymers having at least one reactive carbon-bonded hydroxyl group in compositions comprising of SiC-bonded silicone-polyether copolymers having at least one reactive carbon-bonded hydroxyl group and free polyetherols, wherein the increase in the average molar mass of the silicone-polyether copolymer used in admixture with free polyetherol occurs at least with the same rate as the increase in the molar mass of the free polyetherol present in the starting mixture, the process comprising:

reacting the SiC-bonded silicone-polyether copolymers having at least one reactive carbon-bonded hydroxyl group, in the presence of a double metal cyanide catalyst, with epoxide monomers and, if appropriate, further monomers to form chain-extended, modified silicone-polyether copolymers.

2. The process for preparing alkoxylation products according to claim 1 containing silicone-polyether copolymers by means of double metal cyanide catalysis;

wherein one or more epoxide-functional monomers of the formula (II)

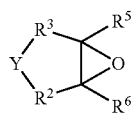

(II)

where

R² or R³ and R⁵ or R⁶ can each, independently of one another, be H or a saturated or either monounsaturated or polyunsaturated, either monovalent or polyvalent hydrocarbon radical which may be further substituted, with the radicals R⁵ or R⁶ being a monovalent hydrocarbon radical and the hydrocarbon radical can be cycloaliphatically bridged via the fragment Y and Y can be absent or can be a methylene bridge having 1 or 2 methylene units, are added either individually or in admixture with further epoxide compounds and, if appropriate, further comonomers such as lactones, cyclic anhydrides, carbon dioxide or oxetanes, either blockwise or randomly onto a silicone-polyether copolymer of the formula (I)

having at least one reactive hydrogen atom, where $m^1$ is an integer from 0 to 500, $m^2$ is an integer from 0 to 60, $m^3$ is an integer from 0 to 60, $m^4$ is an integer from 0 to 10, X is a linear, cyclic or branched, aliphatic or aromatic, saturated or unsaturated hydrocarbon radical which has from 1 to 20 carbon atoms and may optionally contain heteroatoms such as oxygen, nitrogen, phosphorus or sulphur but is preferably a methyl group, $X^1$ can be either X, $X^2$ or $X^3$, $X^2$ is an OH-functional, optionally ester- or carbonate-modified polyoxyalkylene radical of the formula (Ia),

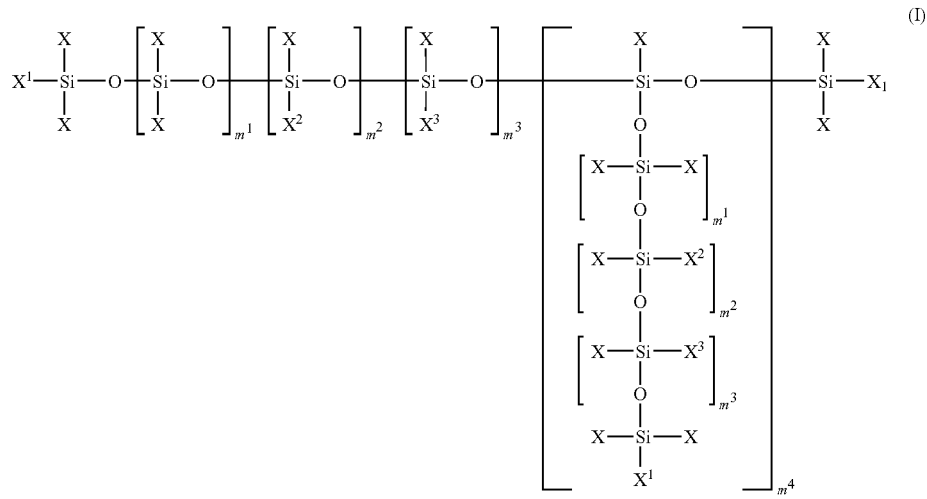

or (VII)

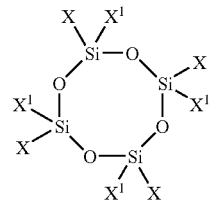

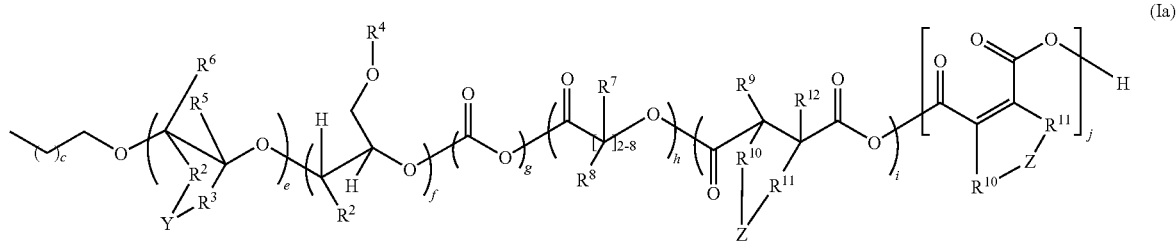

$X^3$ is a terminally etherified polyoxyalkylene radical of the formula (Ib)

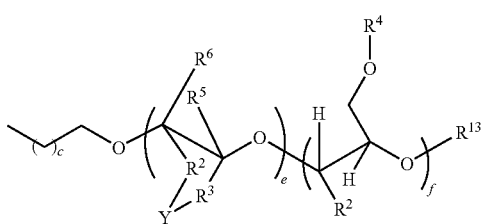

(Ib)

or a polyoxyalkylene radical of the formula (Ic) which has been terminally esterified with a monofunctional carboxylic acid,

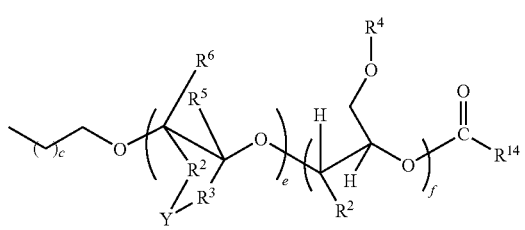

(Ic)

where $R^4$ is a linear or branched alkyl radical which has from 1 to 24 carbon atoms and is bound to an aromatic or cycloaliphatic radical, $R^7$ and $R^8$ are each, independently of one another, either hydrogen or an alkyl, alkoxy, aryl or aralkyl group, $R^9$, $R^{10}$, $R^{11}$ and $R^{12}$ are each, independently of one another, either hydrogen or an alkyl, alkenyl, alkoxy, aryl or aralkyl group, with the hydrocarbon radical being able to be cycloaliphatically or aromatically bridged via the fragment Z, where Z can be either a divalent alkylene radical or alkenylene radical, $R^{13}$ can be an alkyl group having from 1 to 18 carbon atoms, preferably methyl, $R^{14}$ is a saturated or monounsaturated or polyunsaturated, either linear or branched, aliphatic or aromatic hydrocarbon radical which has 1-30 carbon atoms and may bear OH groups and is preferably a methyl radical, and c is an integer from 0 to 24, e is an integer greater than or equal to 5, and f, g, h, i and j are integers from 0 to 500.

* * * * *